Jan. 24, 1961 H. L. WOODALL, JR 2,969,318
SPENT CATALYST SEAL FOR A CATALYTIC REACTOR
Filed Dec. 17, 1956
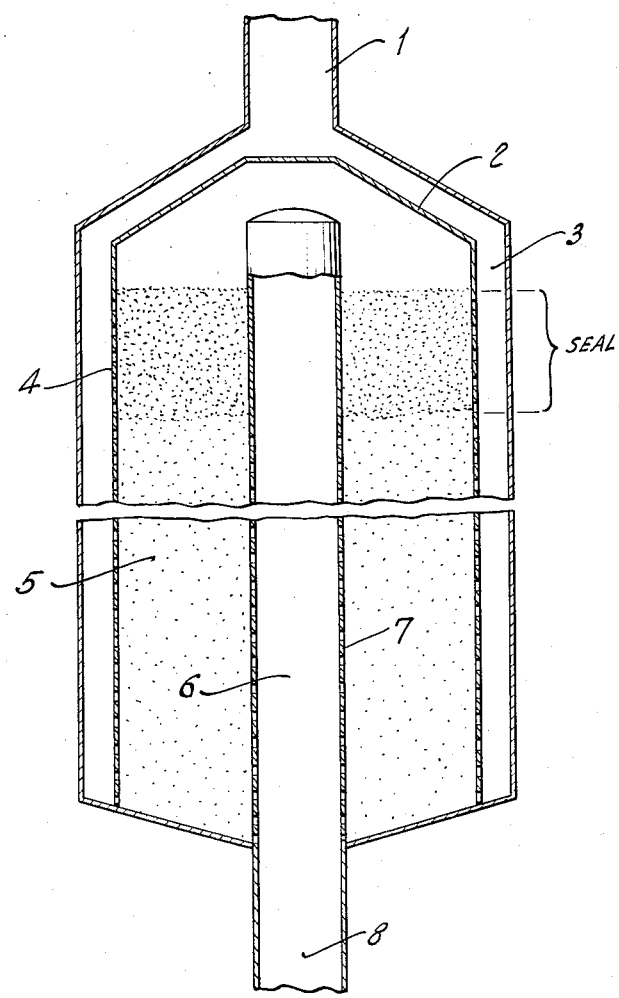

United States Patent Office 2,969,318
Patented Jan. 24, 1961

2,969,318
SPENT CATALYST SEAL FOR A CATALYTIC REACTOR

Harry Lee Woodall, Jr., Port Arthur, Tex., assignor to Texaco Inc., a corporation of Delaware Filed Dec. 17, 1956, Ser. No. 628,605

4 Claims. (Cl. 208—138)

This invention relates to the catalytic treatment of gaseous or vaporous materials, and in one of its more specific aspects it relates to the catalytic conversion of hydrocarbons in a radial flow type reactor.

The radial flow type reactor is particularly useful in the catalytic treatment of gases, in which a fixed catalyst bed is employed, for the reason that it permits a high catalyst loading with low pressure drop. More recently, this type of reactor has come into particular prominence in the reforming of petroleum fractions and in the isomerization of straight chain paraffins for the production of high octane motor fuel.

In contacting a gasiform material with a catalyst in the radial flow type of reactor the gas is introduced into the upper portion of the reactor and distributed into a peripheral chamber. The inner wall of the peripheral chamber may be perforated or may be in the form of a woven wire screen or both. The inner wall of the peripheral chamber also serves as the outer wall of an annular catalyst chamber. The gasiform material penetrates the inner wall of the peripheral chamber to enter the catalyst bed and, following essentially a radial path, passes through the bed of catalyst into a central chamber from whence it leaves the reactor. The wall of the central chamber which forms the inner wall of the annular catalyst chamber may be perforated or may be in the form of a woven wire screen or both.

As a precautionary measure to prevent by-passing of the catalyst in the event of the bed settling or compacting, it is customary to so charge the catalyst that the catalyst bed extends above the uppermost openings of the wall of the central chamber. This portion of the catalyst bed which extends above the uppermost openings of the central chamber is generally called the "seal" and will be so referred to hereinafter. The seal is so arranged in conformity with the structure of the reactor that any gases or vapors entering the seal must travel through the seal or through the seal and the bed proper a distance at least equal to the shortest distance between the peripheral and central chambers.

Prior to starting the isomerization or reforming operation, fresh catalyst is charged to the radial flow type reactor. The catalyst may be of the regenerable type or it may be of the non-regenerable type. In the case of the non-regenerable catalyst, after several months of operation, which may range up to six months or longer, depending on the severity of the operating conditions, the catalyst becomes deactivated to such an extent that its use is no longer feasible commercially. The catalyst in this condition is then referred to as "used" or "spent" catalyst. In the case of the regenerable catalyst when the catalyst has become deactivated, it is customary to interrupt the flow of reactants, regenerate the catalyst in situ and then resume reactant flow. However, even in this latter case there comes a time when the catalyst can no longer be regenerated to an economically practical activity and it too becomes "used" or "spent." When either the regenerable or the non-regenerable catalyst has become spent, the operation is terminated, the spent catalyst is removed from the reactor and is replaced with a charge of fresh catalyst.

For economic considerations, it is mandatory in the case of platinum catalysts to reprocess the spent catalyst whereby the platinum is recovered from the spent catalyst and is used in the preparation of fresh catalyst. Consequently, to maintain substantially continuous operation, it is necessary to maintain a large inventory of platinum catalyst, a portion of which is in use in the reforming or isomerization operation and another portion of which is being reprocessed. Such a large inventory in any event would be undesirable but is particularly so in the case of a platinum catalyst which, in the amount used in the commercial installations, involves an investment of several hundred thousand dollars.

It is an object of this invention to reduce the catalyst inventory necessary to maintain substantially continuous operation.

Another object is to reduce the amount of catalyst which must be reprocessed after having become spent.

A still further object is to operate an isomerization or reforming process without impairing the efficiency of the process using less than a complete charge of fresh catalyst.

I have now discovered that the catalyst seal plays a minor part in the overall catalytic conversion of the gaseous material and that the efficiency of the conversion is not impaired if the seal is not composed of fresh catalyst. Various inert materials may be used to form the seal but I have found that spent catalyst is a particularly desirable material.

When the isomerization or reforming step has been interrupted and the catalyst has been removed from the reactor, the usual practice is to reprocess the entire charge of removed catalyst and to charge the reactor completely with fresh catalyst. However, according to the present invention, the reactor is charged with fresh catalyst only to the uppermost openings of the central chamber, then the balance of the catalyst charge, that is, the portion above the uppermost openings of the central chamber or in other words, the seal is made up of the removed or spent catalyst. Thus, only a portion of the catalyst charged to the reactor is fresh catalyst and only a portion of the removed catalyst is subjected to reprocessing treatment.

In the radial flow type of reactor currently in commercial use for the reforming or isomerization of hydrocarbon fractions, the weight of the catalyst forming the seal amounts to about 10 to 20% of the weight of the entire bed, depending on the depth and width of the bed. Thus, by the use of the present invention, in which the catalyst seal is formed of spent catalyst, considerable saving is achieved. Instead of completely charging the reactor with fresh catalyst, the charge is composed of from 80 to 90% fresh catalyst. In addition, the cost of reprocessing the spent catalyst is reduced by from 10 to 20%. Moreover, the substitution of spent catalyst for from 10 to 20% of the fresh catalyst charged to the reactor apparently has no detrimental effect on the yield or quality of the product.

One embodiment of the invention is disclosed in the accompanying drawing, in which the figure represents diagrammatically a vertical section of a radial flow type of reactor. Incoming gases enter the reactor through a conduit 1 and are diverted by distributing plate 2 into peripheral chamber 3. From peripheral chamber 3 the gases enter the catalyst bed 5 through the openings in wall 4 and then pass into the central chamber 6 through the openings in wall 7 leaving the reactor through conduit 8. According to the present invention, the main body of catalyst bed 5 is made up of fresh catalyst whereas the catalyst seal which is shown as that portion of the bed above the uppermost openings of the central chamber is composed of catalyst which has been used in a previous reforming or isomerization operation.

The following example compares the results obtained when the catalyst bed including the seal was composed of fresh catalyst and when the bed was composed of fresh catalyst except for the seal which was composed of spent catalyst from a previous run. In each case, the starting material charged to the reactor was a naphtha fraction boiling in the approximate range of 200–400° F. and was subjected to reforming conditions in the presence of a platinum on alumina catalyst.

EXAMPLE

Table I below sets forth the data for a continuous run extending for one week in which the catalyst bed had been made up of fresh catalyst. The figures given are the average values for the one week period.

Table I

Reactor charge:
| | | |
|---|---|---|
| Paraffin | vol. percent | 47.8 |
| Naphthene | do | 41.1 |
| Aromatic | do | 11.1 |
| Average temperature | °F | 915 |
| Space velocity, v./v./hr. | | 2.6 |
| Gas recycle | cu. ft./bbl | 9100 |
| $H_2$/hydrocarbon mol ratio | | 8.1 |
| Average pressure | p.s.i.g | 570 |
| Liquid yield $C_5+$ | vol. percent | 79.98 |

ASTM Research Octane No.:
| | |
|---|---|
| Clear | 91.6 |
| +3 cc. TEL | 98.5 |

This run was continued until the activity of the catalyst had reached an economically impractical level, at which time the run was terminated and the catalyst was removed from the reaction zone. Fresh catalyst in the amount of 86.5% of a complete catalyst charge was loaded into the reactor. For the remaining 13.5% of the charge which formed the catalyst seal, spent catalyst which had just been removed from the reactor was used. The reactor was then placed on stream. The data for a weeklong run are set forth in Table II below. As in Table I, the figures given are the average for the one-week period.

Table II

Reactor charge:
| | | |
|---|---|---|
| Paraffin | vol. percent | 46.2 |
| Naphthene | do | 40.6 |
| Aromatic | do | 13.2 |
| Average temperature | °F | 910 |
| Space velocity, v./v./hr. | | 2.9 |
| Gas recycle | cu. ft./bbl | 8500 |
| $H_2$/hydrocarbon mol ratio | | 8.7 |
| Average pressure | p.s.i.g | 620 |
| Liquid yield $C_5+$ | vol. percent | 82.91 |

ASTM Research Octane No.:
| | |
|---|---|
| Clear | 89.9 |
| +3 cc. TEL | 97.7 |

In like manner, when a low boiling straight run naphtha fraction having an IBP—220° F. and consisting primarily of $C_5$-$C_7$ paraffinic hydrocarbons is subjected to isomerization conditions, there is substantially no difference between the product obtained when the entire bed is composed of fresh catalyst and that obtained when the catalyst seal is composed of spent catalyst.

Although the line of demarcation between the seal and the balance of the catalyst bed has been shown as a straight line, it will be obvious that the line of demarcation may be curved or inclined without departing from the spirit of the invention.

In some instances, it may become necessary to shut down a reactor before the catalyst is completely spent and to remove the catalyst, for example, when maintenance work must be performed on the unit. If the catalyst is quite fresh, it may be recharged to the reactor. However, if the catalyst life is substantially depleted as would be the case if the expected catalyst life was six months and it had been in use for some five and one-half months, it would not be expedient to recharge such partially spent catalyst only to be required to shut down the unit and replace the catalyst after a relatively short period of operation. It would be much more expedient to charge the reactor with fresh catalyst and to consider the removed catalyst as spent and to subject it to reprocessing treatment. Under such circumstances, the economic life of the catalyst has been essentially exhausted and for the purposes of this invention such catalyst is considered used or spent.

Although in the description of the process the gases are described as passing in an inward manner from the peripheral chamber through the central chamber, it will be realized that the process is adaptable to a method in which the gases pass outwardly from the central chamber to the peripheral chamber.

Obviously many modifications and variations of the invention, as hereinbefore set forth, may be made without departing from the spirit and scope thereof, and therefore, only such limitations should be imposed as are indicated in the appended claims.

I claim:

1. In a process in which a hydrocarbon fraction is subjected to conversion conditions in a radial flow catalytic reaction zone containing a platinum catalyst, the improvement which comprises providing in said zone a catalyst seal comprising platinum catalyst which has become spent for hydrocarbon conversion purposes, the path of flow of the hydrocarbon through the catalyst bed being substantially parallel to the interface of the catalyst bed and the catalyst seal.

2. The process of claim 1 in which a naphtha fraction is subjected to reforming conditions and the catalyst seal comprises platinum catalyst which has become spent for reforming purposes.

3. The process of claim 1, in which a low boiling straight run naphtha fraction is subjected to isomerization conditions and the catalyst seal comprises platinum catalyst which has become spent for isomerization purposes.

4. The process of claim 1 in which the weight of the seal is between 10–20% of the weight of the entire catalyst bed.

References Cited in the file of this patent

UNITED STATES PATENTS

| | | |
|---|---|---|
| 2,319,620 | Mather | May 18, 1943 |
| 2,363,738 | Mather et al. | Nov. 28, 1944 |
| 2,437,394 | Legatski | Mar. 9, 1948 |
| 2,476,729 | Helmers | July 19, 1949 |
| 2,512,562 | Cummings | June 20, 1950 |
| 2,550,531 | Ciapetta | Apr. 24, 1951 |
| 2,704,741 | Thayer | Mar. 22, 1955 |
| 2,779,714 | Keith | Jan. 29, 1957 |